(12) United States Patent
Bernard et al.

(10) Patent No.: US 7,597,029 B2
(45) Date of Patent: Oct. 6, 2009

(54) DAMPER ASSEMBLY WITH REINFORCING PLATE

(75) Inventors: Jeremy R. Bernard, St. Charles, IL (US); John L. Cagney, Downers Grove, IL (US); James A. Morley, Skokie, IL (US)

(73) Assignee: International Engine Intellectual Property Company LLC, Warrenville, IL (US)

(*) Notice: Subject to any disclaimer, the term of this patent is extended or adjusted under 35 U.S.C. 154(b) by 1324 days.

(21) Appl. No.: 10/270,862

(22) Filed: Oct. 15, 2002

(65) Prior Publication Data
US 2004/0069093 A1    Apr. 15, 2004

(51) Int. Cl.
*F16F 15/12* (2006.01)
*F16C 3/00* (2006.01)

(52) U.S. Cl. .............. 74/574.4; 74/573.12; 74/604; 464/180

(58) Field of Classification Search .......... 74/572–574, 74/600, 604, 603, 574.4; 464/68.91, 90, 464/180
See application file for complete search history.

(56) References Cited

U.S. PATENT DOCUMENTS

| 4,044,627 | A | * | 8/1977 | Zander | 74/574 |
| 5,231,893 | A | * | 8/1993 | Sisco et al. | 74/574 |
| 5,449,322 | A | * | 9/1995 | Wagner | 464/90 |
| 5,695,176 | A | * | 12/1997 | Colford | 267/155 |
| 5,966,996 | A | * | 10/1999 | Hamaekers | 74/574 |
| 6,062,104 | A | * | 5/2000 | Allport | 74/574 |
| 2006/0030441 | A1 | * | 2/2006 | Watanabe et al. | 474/166 |

FOREIGN PATENT DOCUMENTS

WO    WO 91/02176    *    2/1991    ............ 7/574

* cited by examiner

*Primary Examiner*—Vinh T. Luong
(74) *Attorney, Agent, or Firm*—Jack D. Nimz; Jeffrey P. Calfa

(57) ABSTRACT

A reinforcing plate (405) is utilized with a lightweight hub (101) in a vibration damper. Holes (105) formed in the hub (101) and the reinforcing plate (405) allow the vibration damper to be mounted to a shaft with a stronger joint than when the reinforcing plate (405) is not utilized, thereby preventing deformation of the hub (101). Optional reduction holes (111) formed in the hub (101) provide for additional weight reduction, vibration reduction, and/or noise reduction.

1 Claim, 9 Drawing Sheets

US 7,597,029 B2

DAMPER ASSEMBLY WITH REINFORCING PLATE

FIELD OF THE INVENTION

This invention relates to vibration dampers for internal combustion engines, including but not limited to vibration dampers having steel hubs.

BACKGROUND OF THE INVENTION

Vibration dampers for internal combustion engines are known. Vibration dampers reduce vibration by attaching a mass and damping system to a shaft, such as crankshaft, camshaft, driveshaft, balance shaft, and so forth. Vibration dampers are typically comprised of a hub and an inertia ring with a damping element disposed between them. For example, the mass of the inertia ring in combination with the damping element serves to reduce pulsing, torsional vibration imparted on a shaft as the engine fires. Other types of vibration are also dampened.

Vibration dampers are known to be made of cast iron. Cast iron dampers are heavy, have high inertia, and undesirable cost.

Accordingly, there is a need for a lighter weight damper that has less inertia and is less expensive than a cast iron damper.

SUMMARY OF THE INVENTION

An assembly, for use with a shaft, comprises a hub including a guide in which a plurality of mounting holes are formed in a fixed pattern. A reinforcing plate is disposed on the hub. A plurality of mounting holes are formed in the fixed pattern in the reinforcing plate, such that threaded fasteners secure the reinforcing plate and the hub through the plurality of mounting holes in the reinforcing plate and through the plurality of mounting holes in the hub.

DESCRIPTION OF A PREFERRED EMBODIMENT

The following describes an apparatus for and method of utilizing a reinforcing plate with a lightweight hub in a vibration damper. Holes formed in the hub and the reinforcing plate allow the vibration damper to be mounted to a shaft with a stronger joint than when the reinforcing plate is not utilized, thereby preventing deformation of the hub. Optional reduction holes formed in the hub provide for additional weight reduction, vibration reduction, and/or noise reduction.

Figure 1:
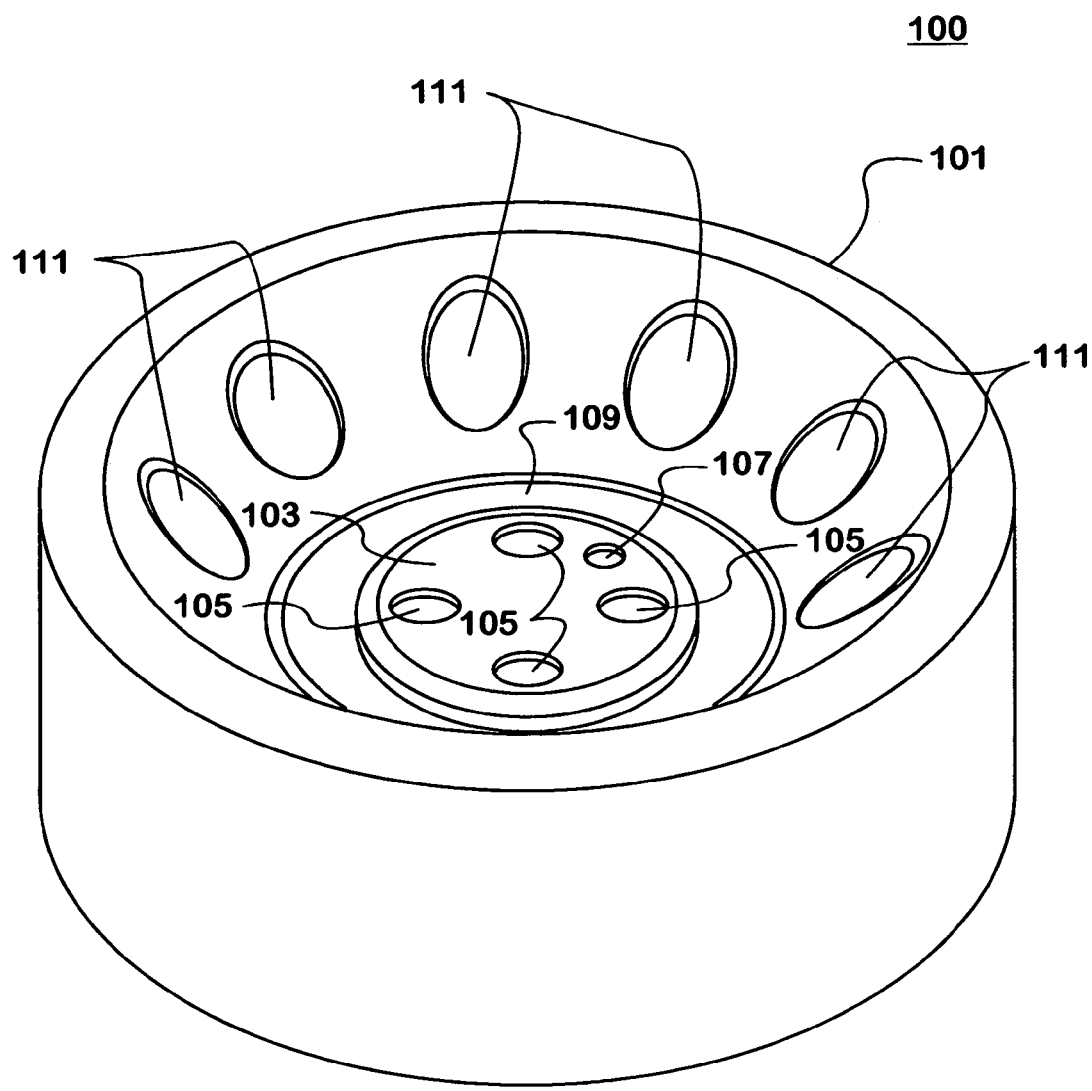
FIG. 1 is a perspective view of a hub for a vibration damper in accordance with the invention.

A perspective view of a hub for a vibration damper is shown in FIG. 1. A lightweight hub 101 is utilized to provide a lighter damper assembly. The lightweight hub 101 is a single piece of metal that is preferably spun or stamped, as known in the art, to form the shape shown in the drawings, including through-holes. The hub 101 is preferably comprised of steel, although it may be comprised of other lightweight metals, such as aluminum, titanium, magnesium, composite materials, and so forth. The hub 101 is formed with a nominal width, for example, 10 gauge steel all around, which is thinner than a cast iron hub, thus resulting in a significantly lighter hub than a cast iron hub.

The hub 101 has a pilot 103 in which is formed a plurality of mounting holes 105 and an optional dowel hole 107. The pilot 103 includes a platform 413 disposed on a cylindrical wall 415 (see FIG. 4) that extends above a sunken segment 109 of the hub 101. The pilot 103 serves as a guide to align the hub 101 axially to the nose of a shaft 407 (see FIG. 4), such as a crankshaft, camshaft, driveshaft, balance shaft, and so forth. The pilot 103 (guide) also serves to reduce radial run-out for the damper. When utilized, a dowel pin 601 (see FIG. 6) extending from the nose of the shaft 407 is inserted into the dowel hole 107 to align the hub 101 with the shaft 407 in a specific orientation. For example, the use of a dowel pin 601 and dowel hole 107 may align the hub 101 to the shaft 407 to achieve a specific orientation of the shaft 407 with respect to the unbalance in the damper assembly. A plurality of reduction holes 111 are formed in the interior of the hub 101 in the wall extending from the top of the hub 101 to the sunken segment 109.

Figure 2:
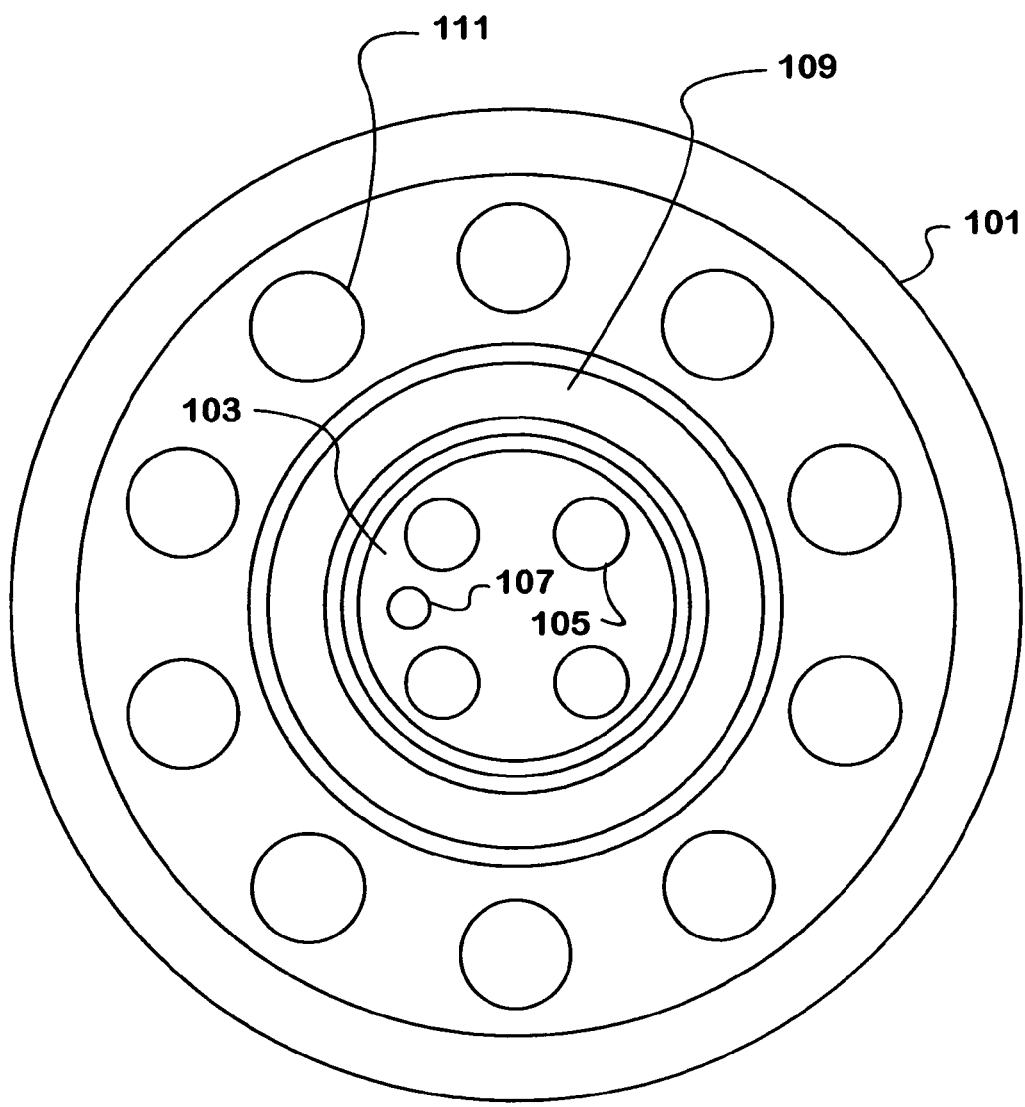
FIG. 2 is a top view of a hub for a vibration damper in accordance with the invention.
Figure 4:
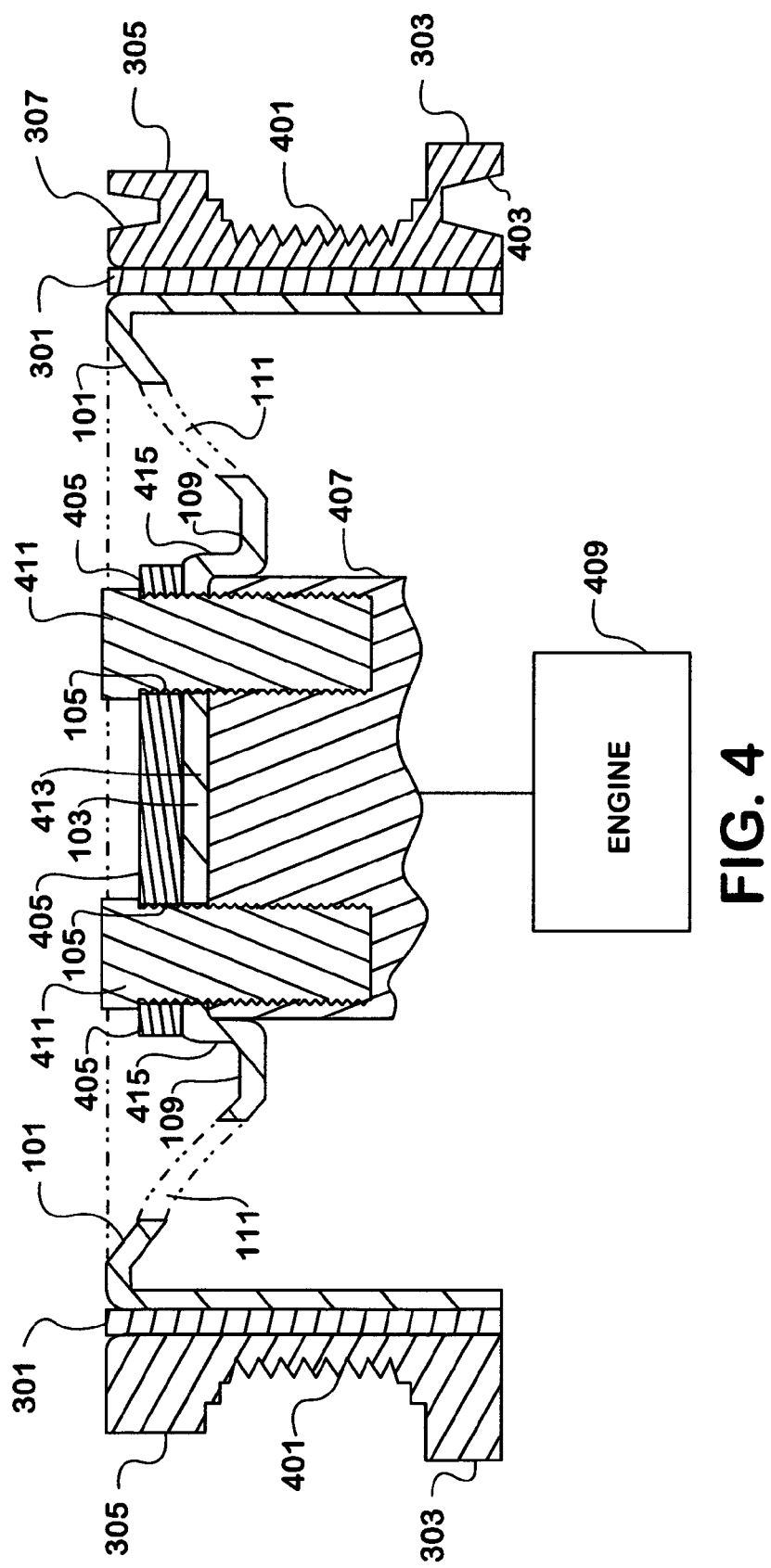
FIG. 4 is a cross-sectional view 4-4 of a vibration damper with an inertia ring having internal unbalance and a reinforcing plate in accordance with the invention.

A top view of a hub for a vibration damper is shown in FIG. 2. This view illustrates the mounting holes 105. Although four mounting holes 105 are shown, any number of mounting holes 105 may be utilized. Bolts 411 inserted through the mounting holes 105 fasten the damper assembly to the shaft 407, as shown in FIG. 4.

Figure 3:
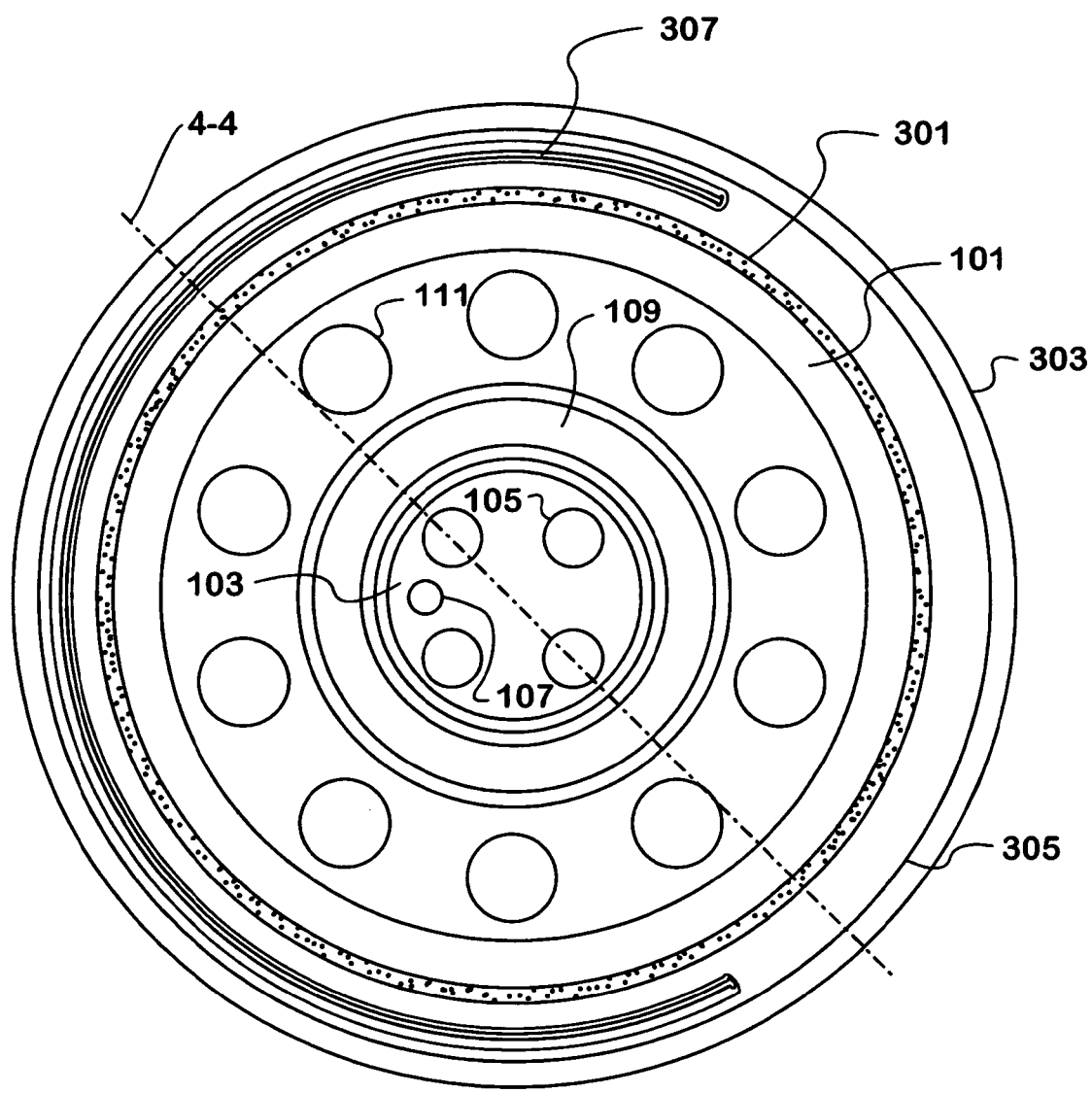
FIG. 3 is a top view of a vibration damper with an inertia ring having internal unbalance in accordance with the invention.
Figure 5:
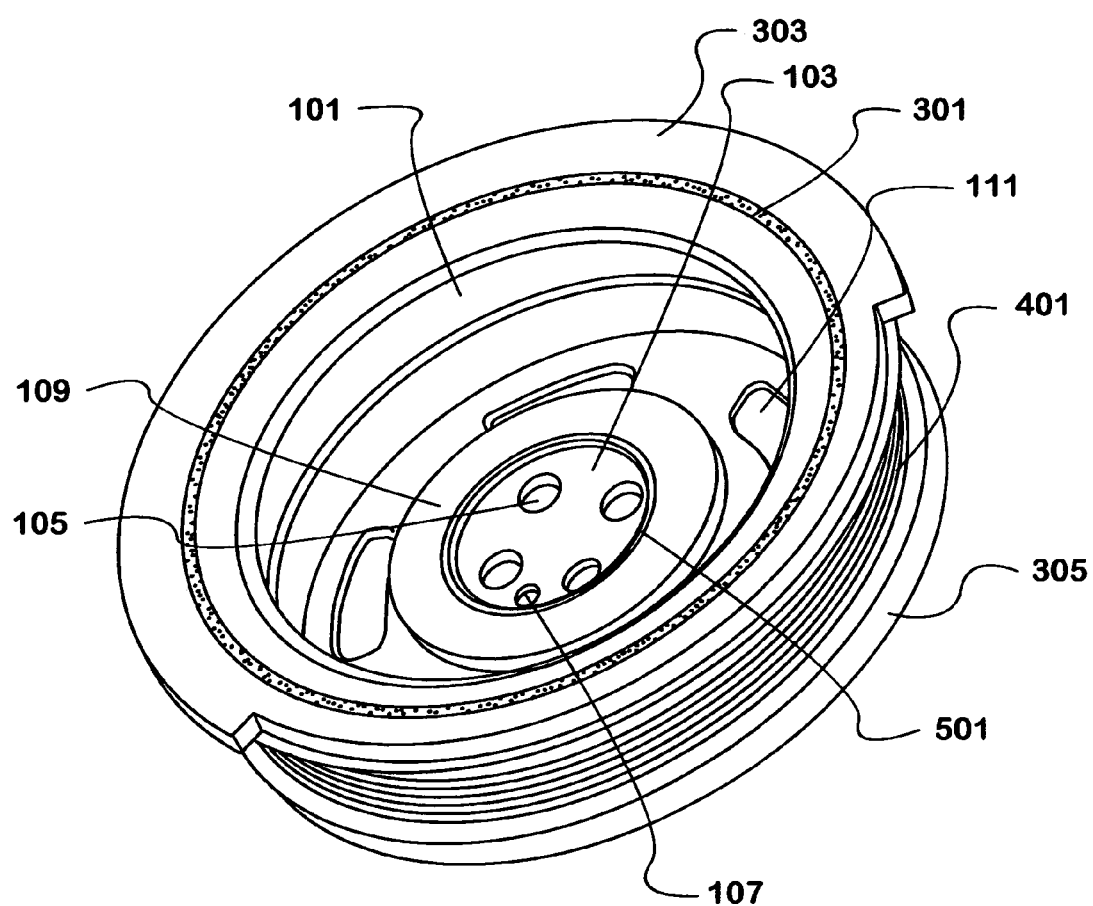
FIG. 5 is a perspective view of the underside of a vibration damper in accordance with the invention.
Figure 6:
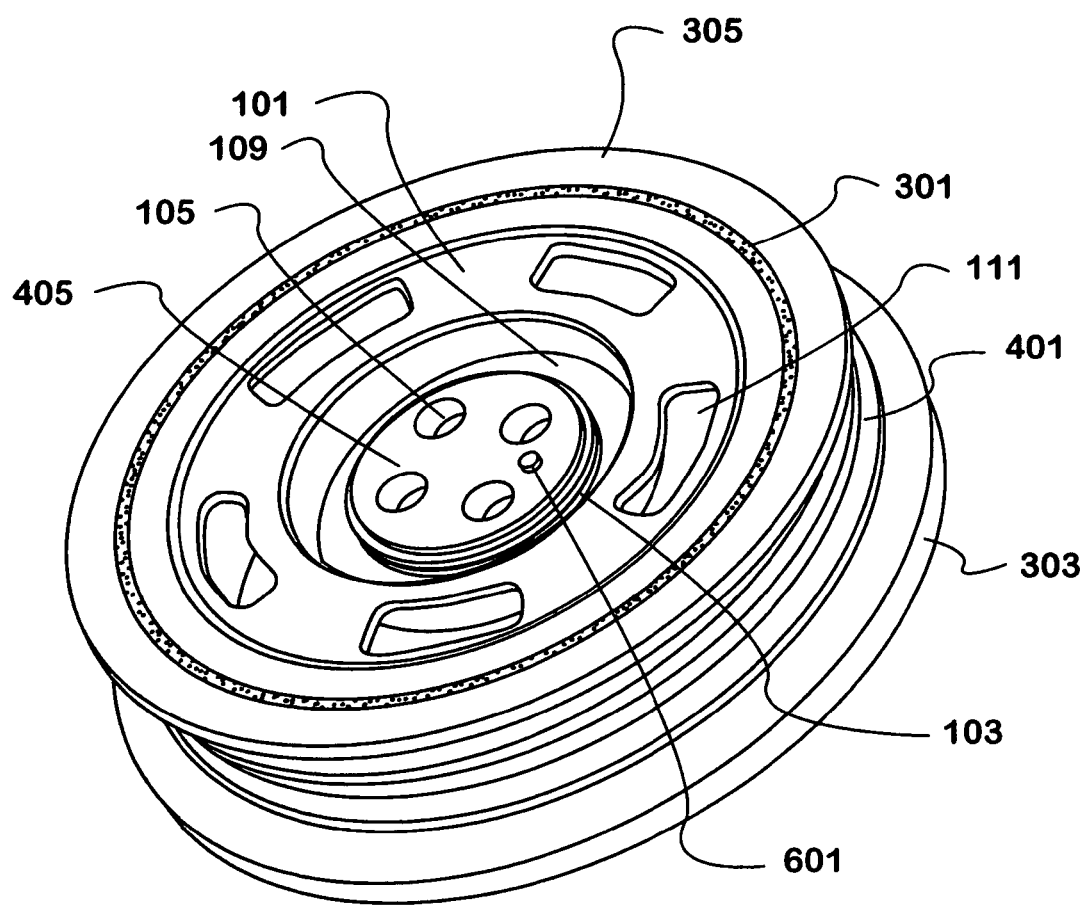
FIG. 6 is a perspective view of the topside of a vibration damper with a reinforcing plate in accordance with the invention.
Figure 7:
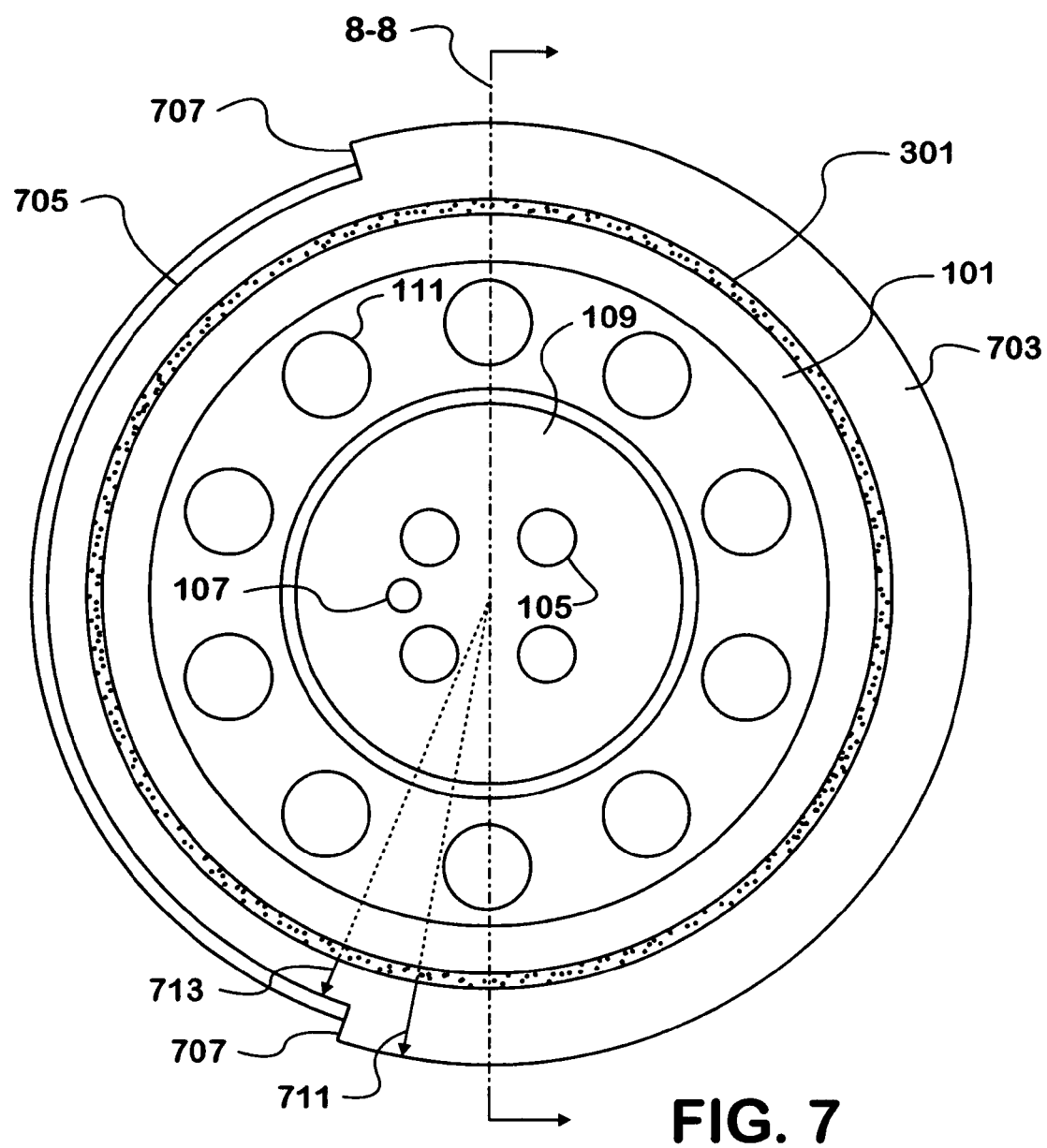
FIG. 7 is a top view of a vibration damper with an inertia ring having external unbalance in accordance with the invention.
Figure 8:
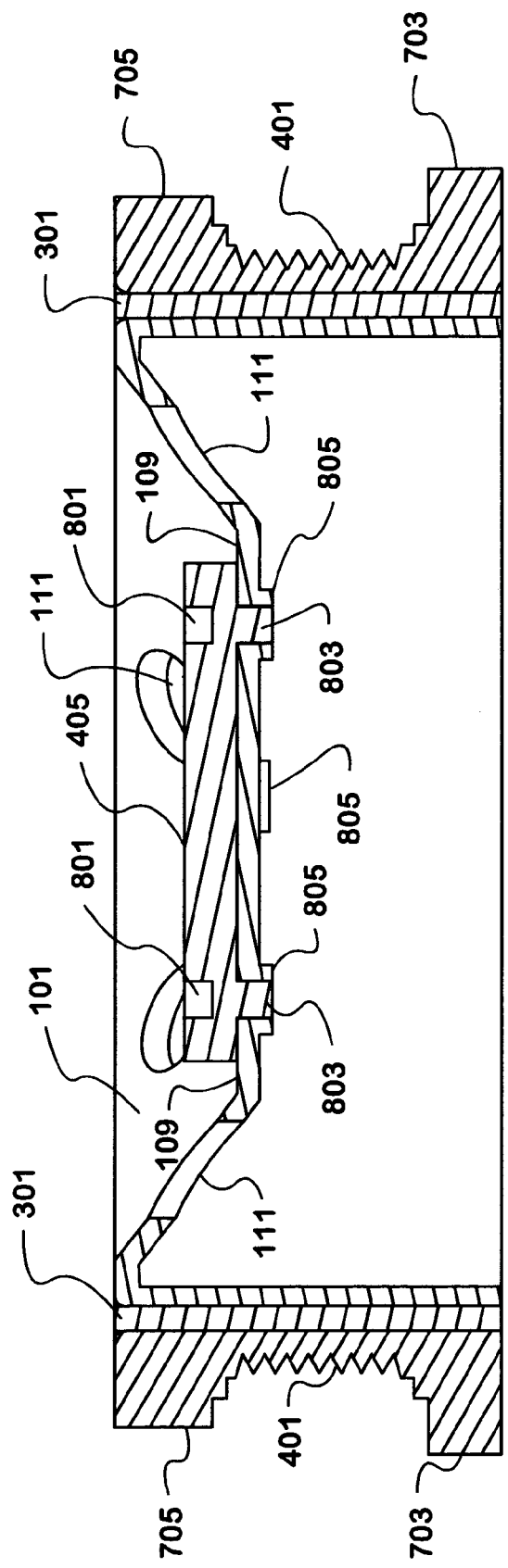
FIG. 8 is a cut-away view 8-8 of a vibration damper with an inertia ring having external unbalance and a reinforcing plate in accordance with the invention.
Figure 9:
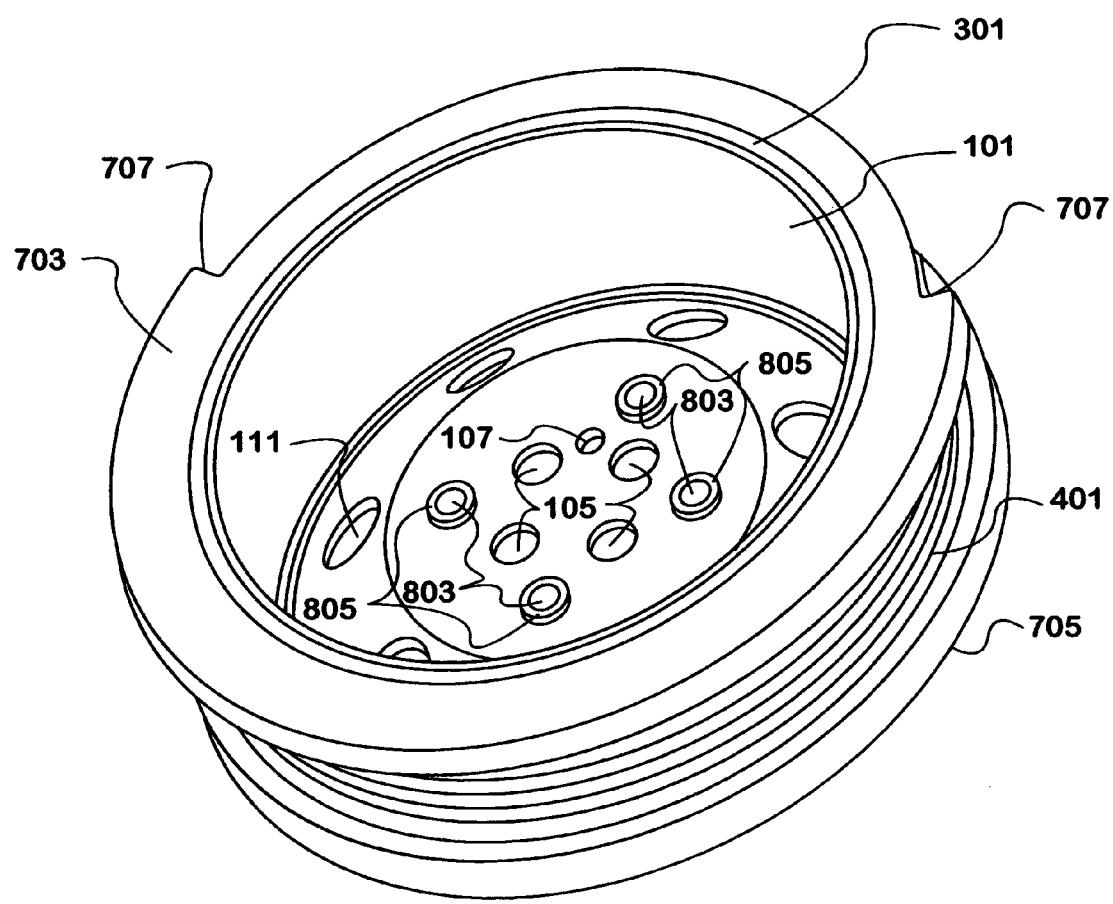
FIG. 9 is a perspective view of the underside of a vibration damper utilizing extrusions in accordance with the invention.

A plurality of reduction holes 111 are formed in a wall in the interior of the hub 101. The reduction holes 111 serve to reduce weight in the hub 101. The reduction holes 111 may have various shapes, such as circular, oval, oblong, rectangular, or other desirable shapes. Any number of reduction holes 111 may be utilized. In the example embodiments shown in the drawings, ten oblong holes 111 are shown in FIG. 1, ten round holes 111 are shown in FIG. 2, FIG. 3, and FIG. 7, five rounded and arced rectangular holes 111 are shown in FIG. 5 and FIG. 6, six oblong holes 111 are shown in FIG. 8, and six round holes 111 are shown in FIG. 9. The reduction holes 111 may be selected to reduce noise caused by the rotating hub 101. Although the reduction holes 111 are shown in the various embodiments as evenly spaced and equally sized holes, the reduction holes 111 may be unevenly spaced and varied in size and number to reduce noise caused by resonance and/or wind through the holes. The holes 111 may be "tuned" to eliminate resonance of other noise components. The reduction holes 111 may also be chosen to reduce vibration and/or to produce unbalance. The number of holes may be odd or even. By varying the number and size of the reduction holes 111 and the distance between the holes, vibration and noise, such as whistling at set frequencies, is reduced when the shaft rotates.

A top view of a vibration damper with an inertia ring having internal unbalance is shown in FIG. 3. A damping element 301, such as a rubber ring or band or a viscous fluid, is disposed on the hub 101 in a manner known in the art, and an inertia ring is disposed along the outer perimeter of the damping element 301 in a manner known in the art. For example, the mass of the inertia ring in combination with the damping element serves to reduce pulsing, torsional vibration imparted on various engine shafts as the engine fires, as well as other sources of vibration. The damping element 301 is attached to the hub 101 in any manner known in the art.

The inertia ring comprises a larger belt guide 303 and a smaller belt guide 305. The belt guides 303 and 305 may be the same size and may take on various shapes, such as rounded, square, and so forth. The belt guides 303 and 305 maintain a belt (not shown) in position on belt grooves (shown in FIG. 4) and between the belt guides 303 and 305. The inertia ring may be cast iron or made of other dense metals, such as steel.

The inertia ring of FIG. 3 has an internal unbalance that is created by removing or forming a trough 307 in one or both belt guides 303 and 305 of the inertia ring. The trough 307 may be formed as part of the inertia ring molding or casting process or may be removed from the inertia ring by post-formation machining or other known methods of removing material. The trough 307 forms a partial circle centered about the center of the hub 101. The extent of unbalance desired determines the percentage of the circle that the unbalance occupies.

A cross-sectional view of a vibration damper with an inertia ring having internal unbalance and a reinforcing plate is shown in FIG. 4. The cross-sectional view is taken at line 4-4 of FIG. 3. The hub 101 is at the center of the damper assembly. The damping element 301 is disposed on the hub 101. The inertia ring is disposed along the outer perimeter of the damping element 301. The inertia ring is shown as a single integrated component comprising the larger belt guide 303, the smaller belt guide 305, and a grooved section 401 that comprises a plurality of grooves on which a belt is disposed. The belt (not shown) is disposed on the grooved section 401 and on the front-end accessory drive (not shown) in order to provide a driving force for devices such as a water pump, compressor, power steering, and so forth. The inertia ring has an internal unbalance in the form of a trough 307 in the smaller belt guide 305 and a trough 403 in the larger belt guide 303.

The lightweight hub 101 is constructed with thinner metal than a cast iron hub, for example, 10-gauge metal all around. Because bolts are used to fasten the damper assembly to a shaft, the thinner metal is not strong enough to withstand the localized torsional and compressive forces that the bolts impart on the hub 101. As a result, material around the holes 105 plasticizes and deforms over time, reducing the effectiveness of the damper.

To overcome the weakness of lightweight hubs to withstand the forces imparted on them by a shaft, a reinforcing plate 405 is utilized. The reinforcing plate 405 has a plurality of mounting holes 105 and a dowel hole 107 and is centered and disposed on either the pilot 103, such as shown in FIG. 1 through FIG. 6, or the sunken segment 109 of the hub 101, such as shown in FIG. 7 through FIG. 9. The reinforcing plate 405 may be constructed from powdered metal or other suitable materials, such as steel, cast iron, titanium, magnesium, and so forth. The reinforcing plate 405 is stronger than the lightweight hub 101, and when the damper assembly is bolted to the shaft through the mounting holes 105 in the reinforcing plate 405 and in the hub 101, the resultant joint is stronger than when the damper assembly is mounted through the lightweight hub 101 alone. The (axial) thickness of the reinforcing plate 405 may be advantageously chosen to provide for the use of standard length bolts to fasten the damper to the shaft. The thickness of the reinforcing plate 405 may also be advantageously chosen to increase the effective length of the fastener. Alternatively, the unbalance for the damper assembly may be located in the reinforcing plate 405.

The mounting holes 105 and an optional dowel hole 107 in the reinforcing plate 405 match the pattern of the mounting holes 105 and dowel hole 107 in the hub 101, such that bolts 411 are inserted through the mounting holes 105 in the reinforcing plate 405 and in the hub 101 and are fastened to the nose of a shaft 407 in the engine 409. When utilized, a dowel pin 601 (see FIG. 6) extending from the nose of the shaft 407 is inserted into the dowel hole 107 to align the hub 101 and the reinforcing plate 405 with the shaft 407 in a specific orientation. The mounting holes 105 are shown equally spaced from each other and from the center of the hub 101. The reinforcing plate 405 may be a separate element and loose from the hub 101 until the plate 405 and hub 101 are bolted to the shaft 407. Alternatively, the reinforcing plate 405 may be attached to the hub 101 in any number of ways, including by staking, as shown in FIG. 7 through FIG. 9.

FIG. 5 illustrates the reinforcing plate 405 as disposed on a pilot 103 in the hub 101. The nose of the shaft 407 fits into the underside of the pilot 103 as shown in FIG. 5, to provide an axial guide for mounting the damper assembly to the shaft 407. A lip 501 may be formed at the interface between the sunken surface 109 and the pilot 103. Utilizing a pilot 103 instead of extrusions 803 and support structures 805 is typically less complicated and less expensive. FIG. 6 illustrates a reinforcing plate 405 disposed on a pilot 103. The reinforcing plate 405 is typically larger in diameter than the platform of the pilot 103.

A top view of a vibration damper with an inertia ring having external unbalance is shown in FIG. 7. A damping element 301, as described above, is disposed on the hub 101, and an inertia ring is disposed along the outer perimeter of the damping element 301.

The inertia ring comprises a larger belt guide 703 and a smaller belt guide 705. The belt guides 703 and 705 serve the function of maintaining a belt (not shown) in position on belt grooves (shown in FIG. 4) and between the belt guides 703 and 705. The inertia ring may be cast iron or made of other dense metals, such as steel. The larger belt guide 703 is generally cylindrical except that it has an unbalance in that part of the larger belt guide 703 has a radial component 711 that is larger than the rest of the belt guide 703, which has a smaller radial component 713. The unbalance serves the function of counteracting the forces imparted on the shaft. The extent of unbalance desired determines the percentage of the circle that the unbalance occupies. Thus, the larger belt guide 703 has a larger outer diameter and a smaller outer diameter, with transitional surfaces 707 in between. The unbalance is externally located in this example. Prior cast iron dampers place the unbalance in the hub. Alternatively, an additional device may be added to create unbalance. The use of unbalance is optional, as the particular application may not require an unbalance.

The smaller belt guide 705 has an outer diameter that is smaller than the larger outer diameter of the larger belt guide 703, but larger than the smaller outer diameter of the larger belt guide 703. The smaller belt guide 705 does not have an unbalance, and thus has circular outer diameter at a single radius.

A cut-away view of a vibration damper with an inertia ring and a reinforcing plate is shown in FIG. 8. The cut-away view shows half the damper assembly illustrated at cut-away line 8-8 of FIG. 7. The hub 101 is at the center of the damper assembly. The damping element 301 is disposed on the hub 101. The inertia ring is disposed along the outer perimeter of the damping element 301. The inertia ring is shown as a single integrated component comprising the larger belt guide 703, the smaller belt guide 705, and the grooved section 401, as described above.

The reinforcing plate 405, as described above, is centered on the sunken segment 109 of the hub 101, such that the mounting holes 105 and dowel hole line up between the hub 101 and the reinforcing plate 405. In the embodiment of FIG. 8, a staking process forms extrusions 803 by pressing or extruding sections 801 of the reinforcing plate 803 into the hub 101 and through support structures 805 on the underside of the hub 101. The extrusions 803 are then deformed on the underside of the hub to prevent the extrusions from slipping back through the extrusion holes, for example, by hammering them over the support structures 805. The extrusions 803 affix the reinforcing plate 803 to the hub 101.

FIG. 9 illustrates the extrusions 803 and support structures 805 on the underside of the hub 101. The supporting structures 805 are shown equally spaced from each other and from the center of the hub 101. The supporting structures 805, in conjunction with the sunken segment 109, serve as a guide to align the hub 101 axially to the nose of the shaft in this embodiment, which does not include a pilot 103 for such alignment.

The present invention advantageously utilizes a reinforcing plate that provides a stronger bolt joint than a steel hub alone can provide. The thickness of the reinforcing plate may be chosen to allow for use of standard-length mounting bolts and increasing effective length of the fastener. A lighter weight damper is provided that does not suffer from strained mounting holes. Reduction holes in the steel damper provide for weight, vibration, and/or noise reduction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An assembly for use with a shaft, the assembly comprising:
   a hub including a plurality of reduction holes formed in a wall of the hub and a guide in which a plurality of mounting holes and a dowel hole are formed in a fixed pattern;
   a damping element disposed on an outer perimeter of the hub;
   an inertia ring disposed on an outer perimeter of the clamping element;
   a reinforcing plate disposed on the hub, wherein a plurality of mounting holes and a dowel hole are formed in the fixed pattern in the reinforcing plate, such that threaded fasteners secure the reinforcing plate and the guide through the plurality of mounting holes in the reinforcing plate and through the plurality of mounting holes in the hub.

\* \* \* \* \*